US007920895B2

(12) United States Patent
van Rooyen

(10) Patent No.: US 7,920,895 B2
(45) Date of Patent: *Apr. 5, 2011

(54) METHOD AND SYSTEM FOR PROVIDING BROADCAST SERVICES THROUGH A CELLULAR AND/OR WIRELESS NETWORK TO A PLURALITY OF MOBILE DEVICES VIA SERVICE PROVIDER INTEGRATION

(75) Inventor: Pieter Gert Wessel van Rooyen, San Diego, CA (US)

(73) Assignee: Broadcom Corporation

( * ) Notice: Subject to any disclaimer, the term of this patent is extended or adjusted under 35 U.S.C. 154(b) by 270 days.

This patent is subject to a terminal disclaimer.

(21) Appl. No.: 12/207,944

(22) Filed: Sep. 10, 2008

(65) Prior Publication Data

US 2009/0011792 A1   Jan. 8, 2009

Related U.S. Application Data

(63) Continuation of application No. 11/010,461, filed on Dec. 13, 2004, now Pat. No. 7,444,165.

(51) Int. Cl.
*H04M 1/00* (2006.01)
(52) U.S. Cl. .................. 455/552.1; 455/3.02; 455/3.04; 455/556.1; 455/12.1; 725/73; 725/76; 725/147
(58) Field of Classification Search ............... 455/552.1, 455/556.1, 3.02, 3.04, 418, 431, 426.1, 3.01, 455/456.1, 414.1, 12.1, 413, 575.7; 725/112, 725/109, 138, 1, 75–77, 73, 30, 153
See application file for complete search history.

(56) References Cited

U.S. PATENT DOCUMENTS

| | | | |
|---|---|---|---|
| 6,643,510 B2 | 11/2003 | Taylor | |
| 6,650,374 B2 | 11/2003 | Choi et al. | |
| 7,103,374 B2 | 9/2006 | Yla-Jaaski et al. | |
| 7,212,781 B2 | 5/2007 | Hikomoto | |
| 2002/0010763 A1 | 1/2002 | Salo et al. | |
| 2002/0059614 A1 | 5/2002 | Lipsanen et al. | |
| 2003/0228892 A1 | 12/2003 | Maalismaa et al. | |
| 2004/0198217 A1 | 10/2004 | Lee et al. | |
| 2005/0043020 A1 | 2/2005 | Lipsanen et al. | |
| 2005/0215194 A1 | 9/2005 | Boling et al. | |
| 2006/0056448 A1* | 3/2006 | Zaki et al. ................ 370/466 |
| 2006/0128304 A1 | 6/2006 | Ramaswamy et al. | |
| 2006/0212909 A1 | 9/2006 | Girard et al. | |

FOREIGN PATENT DOCUMENTS

WO   WO 2004/080011   9/2004

* cited by examiner

*Primary Examiner* — Sujatha Sharma
(74) *Attorney, Agent, or Firm* — McAndrews, Held & Malloy, Ltd.

(57) ABSTRACT

A system for controlling signal processing in a multi-network device is disclosed and may include one or more circuits that enable receiving of a digital video broadcast signal. The one or more circuits may enable processing a channel of the digital video broadcast signal according to a first selection. At least one channel of the digital video broadcast signal may include broadcast multimedia content. The one or more circuits may enable receiving a cellular communication signal and processing the cellular communication signal according to a second selection. The broadcast multimedia content may include Internet content. The one or more circuits may enable storing at least a portion of the received digital video broadcast signal and at least a portion of the received cellular communication signal in a commonly accessible memory.

52 Claims, 11 Drawing Sheets

METHOD AND SYSTEM FOR PROVIDING BROADCAST SERVICES THROUGH A CELLULAR AND/OR WIRELESS NETWORK TO A PLURALITY OF MOBILE DEVICES VIA SERVICE PROVIDER INTEGRATION

CROSS-REFERENCE TO RELATED APPLICATIONS/INCORPORATION BY REFERENCE

This application is a continuation of U.S. patent application Ser. No. 11/010,461 filed Dec. 13, 2004.

This application makes reference to:
U.S. application Ser. No. 11/010,991, filed Dec. 13, 2004;
U.S. application Ser. No. 11/010,847, filed Dec. 13, 2004;
U.S. application Ser. No. 11/010,877, filed Dec. 13, 2004;
U.S. application Ser. No. 11/010,914, filed Dec. 13, 2004;
U.S. application Ser. No. 11/010,486, filed Dec. 13, 2004;
U.S. application Ser. No. 11/010,903, filed Dec. 13, 2004;
U.S. application Ser. No. 11/011,009, filed Dec. 13, 2004;
U.S. application Ser. No. 11/010,855, filed Dec. 13, 2004;
U.S. application Ser. No. 11/010,743, filed Dec. 13, 2004;
U.S. application Ser. No. 11/010,983, filed Dec. 13, 2004;
U.S. application Ser. No. 11/011,000, filed Dec. 13, 2004;
U.S. application Ser. No. 11/010,681, filed Dec. 13, 2004;
U.S. application Ser. No. 11/010,883, filed Dec. 13, 2004;
U.S. application Ser. No. 11/011,006, filed Dec. 13, 2004;
U.S. application Ser. No. 11/010,487, filed Dec. 13, 2004;
U.S. application Ser. No. 11/010,481, filed Dec. 13, 2004; and
U.S. application Ser. No. 11/010,524, filed Dec. 13, 2004.

All of the above stated applications are hereby incorporated herein by reference in their entirety.

FIELD OF THE INVENTION

Certain embodiments of the invention relate to communication of information via a plurality of different networks. More specifically, certain embodiments of the invention relate to a method and system for providing broadcast services through a cellular and/or Wireless Network to a plurality of mobile devices via service provider integration.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 µs is for an 8 MHz channel. In the "8K" mode there are 6,817 carrier frequencies, each with a useful symbol duration of 896 µs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 µs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communicating information via a plurality of different networks. The method may comprise receiving in a mobile terminal, broadcast information via a VHF/UHF broadcast communication path and simultaneously receiving in the mobile terminal, cellular information via a cellular communication path. The method may further comprise switching between processing of the broadcast information received via the VHF/UHF broadcast communication path and the cellular information received via the cellular communication path based on a measured broadcast signal statistic associated with a signal bearing the broadcast information and a measured cellular signal statistic associated with a signal bearing the cellular information. The broadcast information and the cellular information may be the same information. The broadcast information and the cellular information may comprise video data, and/or audio such as MP3 formatted audio data. The cellular information may comprise voice data or data such as short message service (SMS) data.

Content from at least the VHF/UHF broadcast communication path may be selected for consumption based on the measured broadcast signal statistic associated with a signal bearing the broadcast information and the measured cellular signal statistic associated with a signal bearing the cellular information. An input that is received may be utilized to select at least a portion of content associated with the broadcast information and at least a portion of the content associated with the cellular information. The mobile terminal may be adapted to display a user interface that facilitates the switching. An indication of content available via at least one of the VHF/UHF broadcast communication path and the cellular communication path may be displayed. The broadcast information may be received at a lower bit rate at the mobile terminal than a bit rate at which the broadcast information is transmitted from a broadcaster that originally broadcasts the broadcast information that is received via the VHF/UHF communication path. At least a portion of the received broadcast information and at least a portion of the received cellular information may be stored in a commonly accessible memory.

The method may further comprise coordinating communication of information associated with the received broadcast communication and the received cellular information via a communication interface integrated in the mobile terminal that handles the processing of the broadcast information and/or the cellular information. A request may be generated via the cellular communication path to receive the broadcast information via the broadcast communication path. The request may be generated utilizing a communication interface integrated in the mobile terminal that handles the processing of the broadcast information and the cellular information. In another aspect of the invention, a request may be generated via the cellular communication path to receive at least a portion of the broadcast information via the broadcast communication path and at least a remaining portion of the broadcast information via the cellular communication path. In this regard, the request may be generated utilizing a communication interface integrated in the mobile terminal that handles the processing of the broadcast information and the cellular information.

Another embodiment of the invention may provide a machine-readable storage, having stored thereon, a computer program having at least one code section executable by a machine, thereby causing the machine to perform the steps as described above for communicating information via a plurality of different networks.

Aspects of the system may comprise circuitry in a mobile terminal that receives broadcast information via a VHF/UHF broadcast communication path and simultaneously receives in the mobile terminal, cellular information via a cellular communication path. The system may further comprise circuitry in the mobile terminal that switches between processing of the broadcast information received via the VHF/UHF broadcast communication path and the cellular information received via the cellular communication path based on a measured broadcast signal statistic associated with a signal bearing the broadcast information and a measured cellular signal statistic associated with a signal bearing the cellular information. The broadcast information and the cellular information may be the same information. The broadcast information and the cellular information may comprise video data. The cellular information may comprise voice data.

Circuitry may be provided that selects content from at least the VHF/UHF broadcast communication path for consumption based on the measured broadcast signal statistic associated with a signal bearing the broadcast information and the measured cellular signal statistic associated with a signal bearing the cellular information. Circuitry may be provided that receives an input, which may be utilized to select at least a portion of content associated with the broadcast information and at least a portion of the content associated with the cellular information. The mobile terminal may comprise circuitry that may be adapted to display a user interface that facilitates the switching. Circuitry provided may display an indication of content available via at least one of the VHF/UHF broadcast communication path and the cellular communication path. The mobile terminal may be adapted to receive broadcast information that has a lower bit rate than a bit rate of the broadcast information that is transmitted from a broadcaster that originally broadcasts the broadcast information that is received via the VHF/UHF communication path. A commonly accessible memory or common interface may be adapted to store at least a portion of the received broadcast information and at least a portion of the received cellular information.

The system may further comprise circuitry that coordinates communication of information associated with the received broadcast communication and the received cellular information via a communication interface integrated in the mobile terminal that handles the processing of the broadcast information and/or the cellular information. Circuitry may be provided that generates a request via the cellular communication path to receive the broadcast information via the broadcast communication path. The request may be generated utilizing a communication interface integrated in the mobile terminal that handles the processing of the broadcast information and the cellular information. In another aspect of the invention, circuitry may be utilized to generate a request via the cellular communication path to receive at least a portion of the broadcast information via the broadcast communication path and at least a remaining portion of the broadcast information via the cellular communication path. In this regard, the circuitry may generate the request utilizing a communication interface integrated in the mobile terminal that handles the processing of the broadcast information and the cellular information.

Another embodiment of the invention provides a method for communicating information via a plurality of different networks comprising receiving broadcast information in a mobile terminal via a VHF/UHF broadcast communication path. Cellular information comprising voice and data may be received in the mobile terminal from a bidirectional cellular communication path and Internet information may be received in the mobile terminal via a downlink only cellular communication path. Uplink Internet related information may be transmitted via an uplink path of the bidirectional cellular communication path. The Internet information may be received from a service provider and the service provider may determine whether to deliver the Internet information via the downlink only cellular communication path and/or VHF/UHF broadcast communication path. In one embodiment of the invention, the service provider may be integrated with a wireless service provider that handles the bi-directional cellular communication path and the downlink only cellular communication path. In another embodiment of the invention, the service provider may be integrated with a broadcast service provider that handles the VHF/UHF broadcast communication path.

The method may further comprise generating a request by the mobile terminal that instructs the service provider to deliver the requested Internet information via the downlink only cellular communication path. The mobile terminal may be adapted to request Internet information via the uplink path and receiving the requested Internet information via the VHF/UHF broadcast communication path. The mobile terminal may generate a request that instructs the service provider to deliver the requested Internet information via the VHF/UHF broadcast communication path. The method may further comprise selecting between receiving the broadcast information, the cellular information, or the Internet information, and selecting between transmitting the Internet related information or the cellular information. The mobile terminal may comprise a common interface that facilitates communication between at least one cellular processor that processes the cellular information and the Internet information, and a broadcast processor that processes the broadcast information.

Another embodiment of the invention may comprise a system for communicating information via a plurality of different networks comprising circuitry in a mobile terminal that receives broadcast information via a VHF/UHF broadcast communication path. Cellular information comprising voice and data may be received by circuitry in the mobile terminal from a bidirectional cellular communication path. Circuitry in the mobile terminal may also receive Internet information via a downlink only cellular communication path. Uplink Internet related information may be transmitted by circuitry in the mobile terminal via an uplink path of the bidirectional cellular communication path. The Internet information may be received from a service provider and the service provider may determine whether to deliver the Internet information via the downlink only cellular communication path and/or VHF/UHF broadcast communication path. In one embodiment of the invention, the service provider may be integrated with a wireless service provider that handles the bidirectional cellular communication path and the downlink only cellular communication path. In another embodiment of the invention, the service provider may be integrated with a broadcast service provider that handles the VHF/UHF broadcast communication path.

The system may further comprise circuitry in the mobile terminal that generates a request that instructs the service provider to deliver the requested Internet information via the downlink only cellular communication path. Circuitry in the mobile terminal may be adapted to request Internet information via the uplink path and receiving the requested Internet information via the VHF/UHF broadcast communication path. Circuitry in the mobile terminal may generate a request that instructs the service provider to deliver the requested Internet information via the VHF/UHF broadcast communication path. The system may further comprise circuitry that selects between receiving the broadcast information, the cellular information, or the Internet information. Circuitry in the mobile terminal may be utilized to select between transmitting the Internet related information or the cellular information. The mobile terminal may comprise a common interface that facilitates communication between at least one cellular processor that processes the cellular information and the Internet information, and a broadcast processor that processes the broadcast information. In one embodiment of the invention, the common interface may be a memory interface of interfacing circuitry.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for communicating information via a plurality of different networks. The method may comprise receiving broadcast information via a VHF/UHF broadcast communication path at a mobile terminal. Cellular information comprising voice and data may be simultaneously received via the mobile terminal from a cellular communication path. The method may comprise switching between processing of the broadcast information via the VHF/UHF broadcast communication path and the cellular information via the cellular communication path based on a measured broadcast signal statistic associated with a signal bearing the broadcast information and a measured cellular signal statistic associated with a signal bearing the cellular information.

Figure 1A:
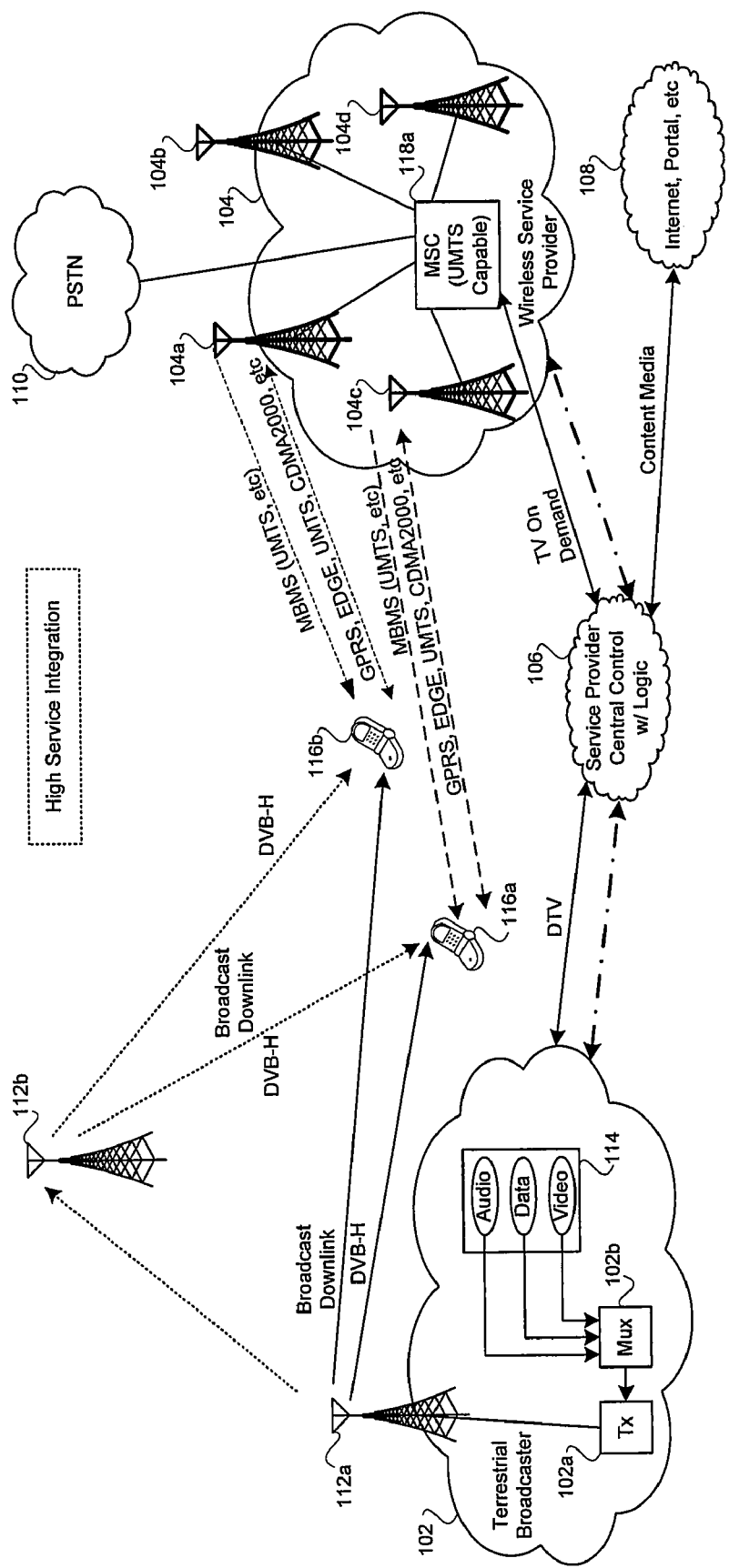
FIG. 1a is a block diagram of an exemplary system for providing integrated services between a cellular network and a digital video broadcast network, in accordance with an embodiment of the invention.

FIG. 1a is a block diagram of an exemplary system for providing integrated services between a cellular network and a digital video broadcast network, in accordance with an embodiment of the invention. Referring to FIG. 1a, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802.x based communication link such an 802.16 or WiMax broadband access communication link. In another exemplary embodiment of the invention, at least one of these connections may be a broadband line of sight (LOS) connection.

The wireless service provider network 104 may be a cellular or personal communication service (PCS) provider that may be adapted to handle broadcast UMTS (B-UMTS). The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bidirectional services via uplink and downlink communication channels, while the B-UMTS or MBMS network may be utilized to provide a unidirectional broadband services via a downlink channel. The B-UMTS or MBMS unidirectional downlink channel may be utilized to broadcast content media and/or multimedia type information to the mobile terminals 116a and 116b. Although MBMS provides only unidirectional downlink communication, the invention may be not so limited. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 104 and/or a load on the wireless service provider network 104. Load management may be utilized to distribute the flow of information throughout the terrestrial broadcast network 104 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through an MBMS channel via the base station 104c to the mobile terminal 116a. The requested information may be acquired from the content source 114 and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the portal 108 or content service 114 to the mobile terminal 116b. The service provider 106 may also have the capability to send at least a portion of information to be delivered to, for example, mobile terminal 116a via the VHF/UHF broadcast channel and a remaining portion of the information to be delivered via the cellular broadcast channel.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118a. Accordingly, the MSC 118a may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast VHF/UHF technologies. In an exemplary embodiment of the invention, the mobile terminals 116a, 116b may be adapted to utilize one or more cellular access technologies such as GSM, GPRS, EDGE, CDMA, WCDMA, CDMA2000, HSDPA and MBMS (B-UMTS). The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may also be adapted to receive VHF/UHF broadcast information from either the base stations 104a, 104b, 104c, 104d or the VHF/UHF broadcast antennas 112a and 112b. In instances where a mobile terminal receives broadcast information from any of the base stations 104a, 104b, 104c, or 104d via a downlink MBMS communication channel, then the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VHF/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

Figure 1B:
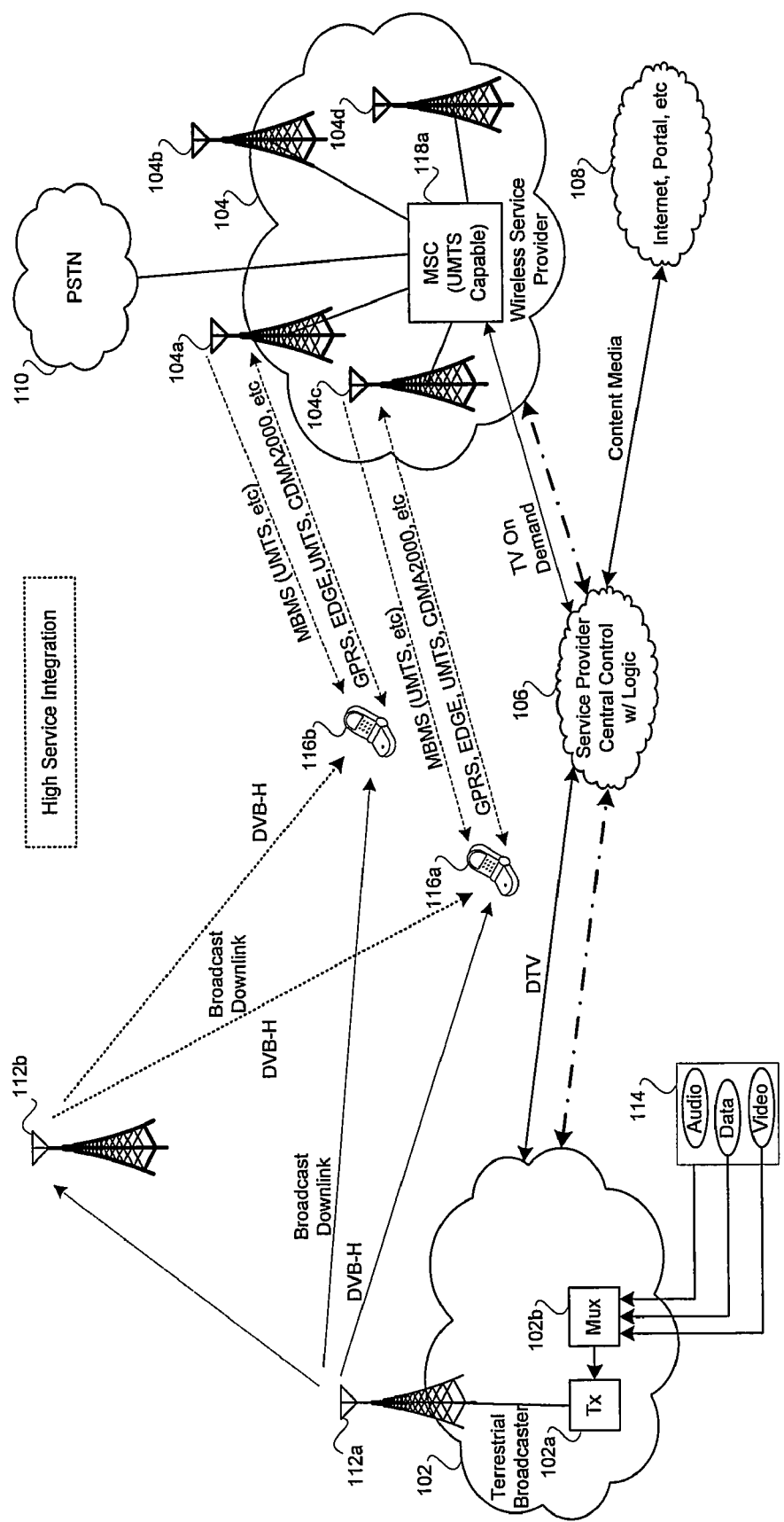
FIG. 1b is a block diagram of an alternative embodiment of the exemplary system of FIG. 1a for providing integrated services between a cellular network and a digital video broadcast network, in accordance with an embodiment of the invention.

FIG. 1b is a block diagram of an alternative embodiment of the exemplary system of FIG. 1a for providing integrated services between a cellular network and a digital video broadcast network, in accordance with an embodiment of the invention. Referring to FIG. 1b, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. Although VHF/UHF broadcast antenna 112b is illustrated separately from the terrestrial broadcast network 102, it may still be part of the terrestrial broadcast network 102. The wireless service provider network 104 may comprise mobile switching center (MSC) 118a, and a plurality of cellular base stations 104a, 104b, 104c, and 104d.

The system of FIG. 1b is somewhat similar to the FIG. 1a with the exception that FIG. 1b has the content source 114 located external to the terrestrial broadcast network 102. The content source 114, which may also be referred to as a data carousel, may comprise audio, data and video content. At least a portion of the audio, data and/or video content stored in the content source 114 may be linked so that if information cannot be retrieved from the content source 114, then it may be received from the portal 108. In the system of FIG. 1b, a provider other than the terrestrial broadcaster 102 may manage the content source 114. Notwithstanding, the audio, video and/or data from the content source 114 may still be multiplexed by the multiplexer 102b in the terrestrial broadcast network 114.

Figure 1C:
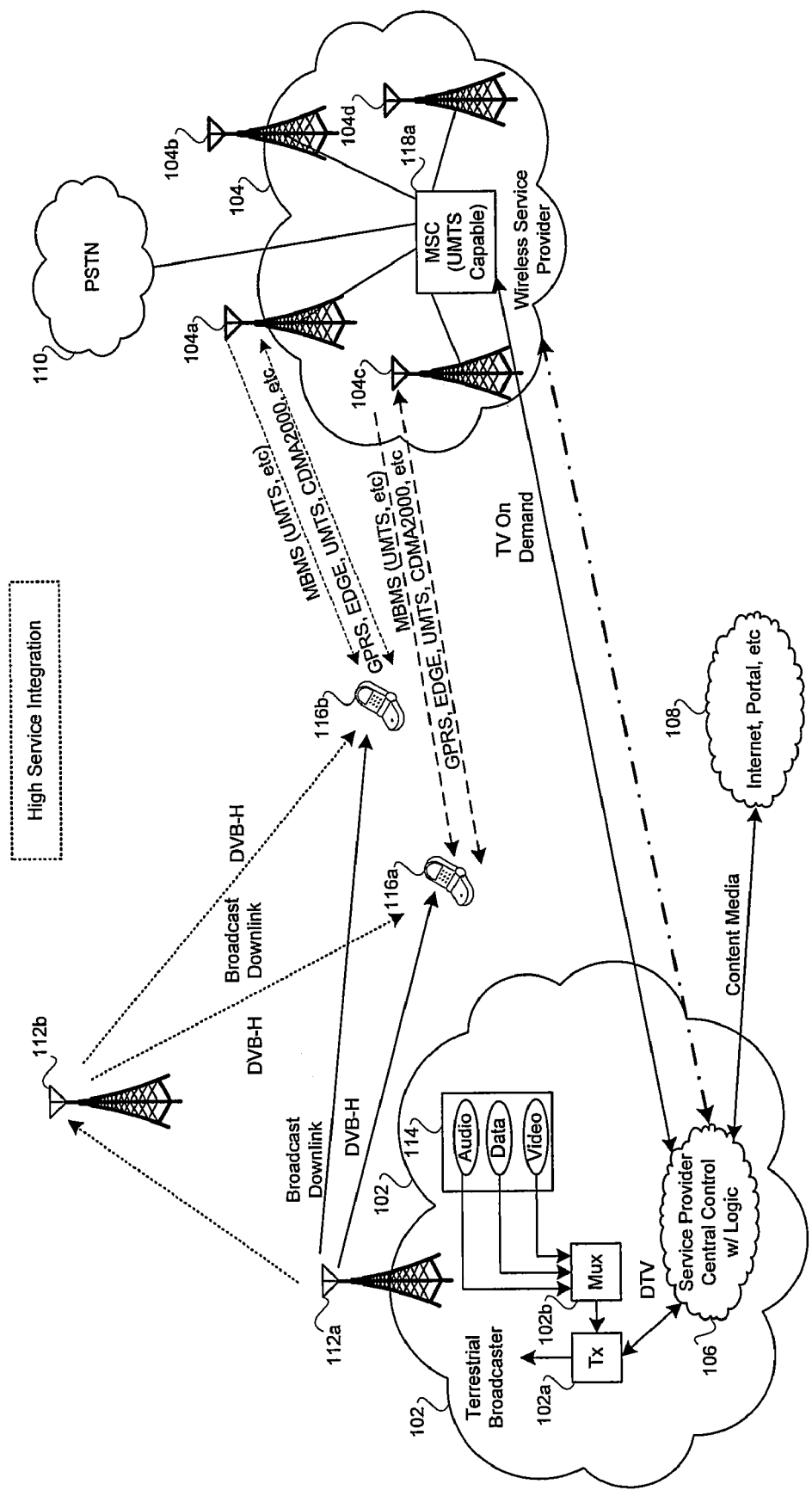
FIG. 1c is a block diagram of an alternative embodiment of the exemplary system of FIG. 1a for providing integrated services between a cellular network and a digital video broadcast network, in accordance with an embodiment of the invention.

FIG. 1c is a block diagram of an alternative embodiment of the exemplary system of FIG. 1a for providing integrated services between a cellular network and a digital video broadcast network, in accordance with an embodiment of the invention. Referring to FIG. 1c, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, service provider 106, and VHF/UHF broadcast antennas 112a and 112b. The wireless service provider network 104 may comprise mobile switching center (MSC) 118a, and a plurality of cellular base stations 104a, 104b, 104c, and 104d.

The system of FIG. 1c is somewhat similar to the FIG. 1a with the exception that FIG. 1b has the service provider 106 co-located with the terrestrial broadcast network 102. In this regard, the terrestrial broadcast network 102 may control the functions of the service provider 106. Since the terrestrial broadcast network 102 controls the functions of the service provider, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider, the integrated control and logic services provided the terrestrial broadcaster network 102 and service provider 106 may instantly make decisions of how best to handle information for a mobile terminal.

Figure 1D:
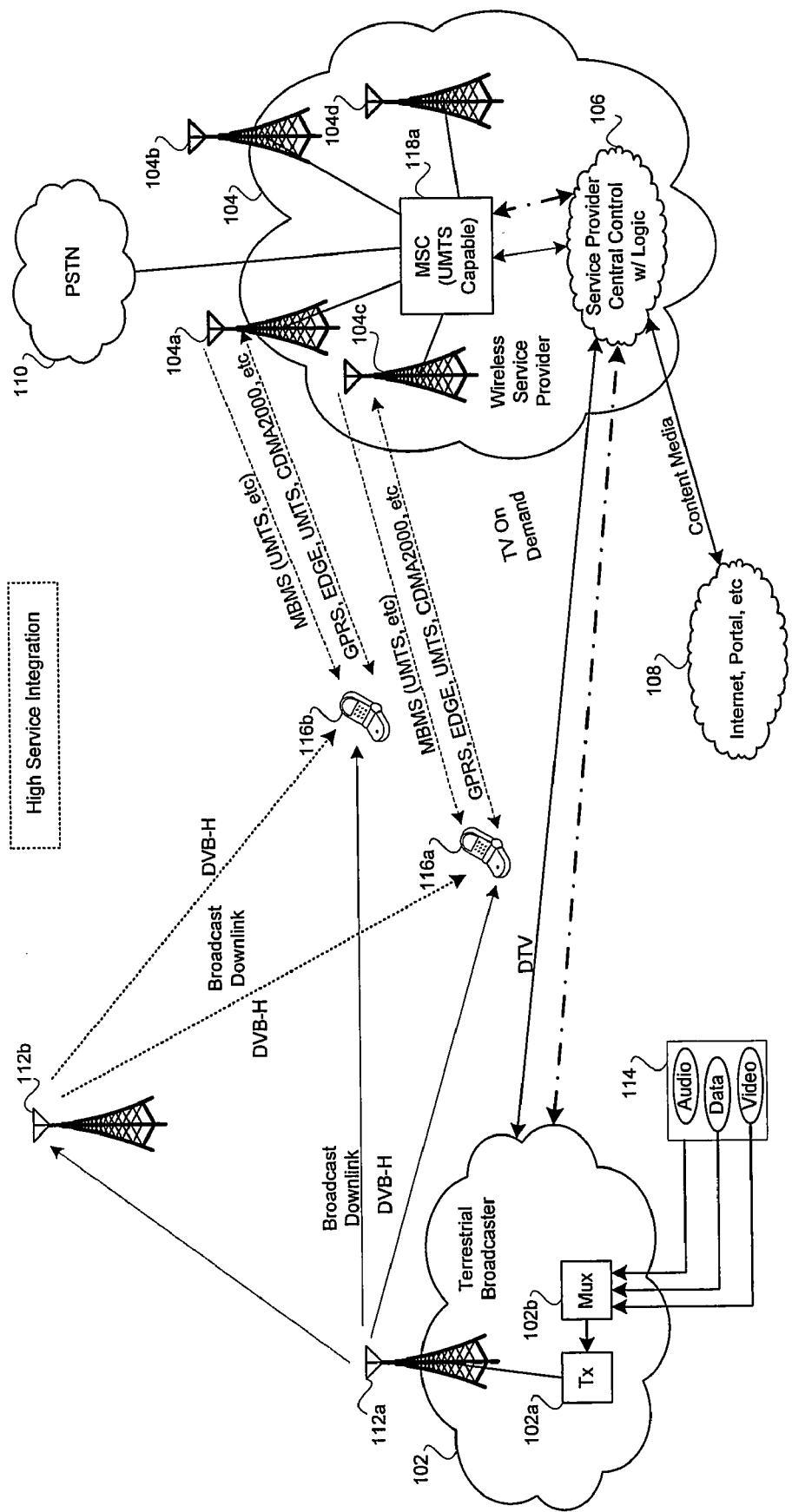
FIG. 1d is a block diagram of an alternative embodiment of the exemplary system of FIG. 1a for providing integrated services between a cellular network and a digital video broadcast network, in accordance with an embodiment of the invention.

FIG. 1d is a block diagram of an alternative embodiment of the exemplary system of FIG. 1a for providing integrated services between a cellular network and a digital video broadcast network, in accordance with an embodiment of the invention. Referring to FIG. 1d, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. The wireless service provider network 104 may comprise service provider 106, mobile switching center (MSC) 118a, and a plurality of cellular base stations 104a, 104b, 104c, and 104d.

The system of FIG. 1d is somewhat similar to the FIG. 1a with the exception that FIG. 1b has the service provider 106 co-located with the wireless service provider network 104. In this regard, the wireless service provider network 104 may control the functions of the service provider 106. Since the wireless service provider network 104 controls the functions of the service provider 106, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider 106 as illustrated in FIG. 1a, the integrated control and logic services provided the service provider 106 may instantly make decisions of how best to handle communication of information for a mobile terminal.

In another embodiment of the invention, since many of the services provided by the service provider 106 may already be integrated into the wireless service provider's 104 infrastructure, then the complexity of the service provider functions may be significantly reduced. For example, the wireless service provider 104, the latter of which already has the pertinent infrastructure in place, may now handle operation administration maintenance and provisioning (OAM&P) functions, which may be required by the service provider 106. Since the uplink capabilities are inherent in only the wireless service provider network 104, and the service provider function are also located within the service provider network 106, the uplink capabilities for the mobile stations 116a, 116b may be more efficiently managed from within the wireless service provider network 104.

Figure 1E:
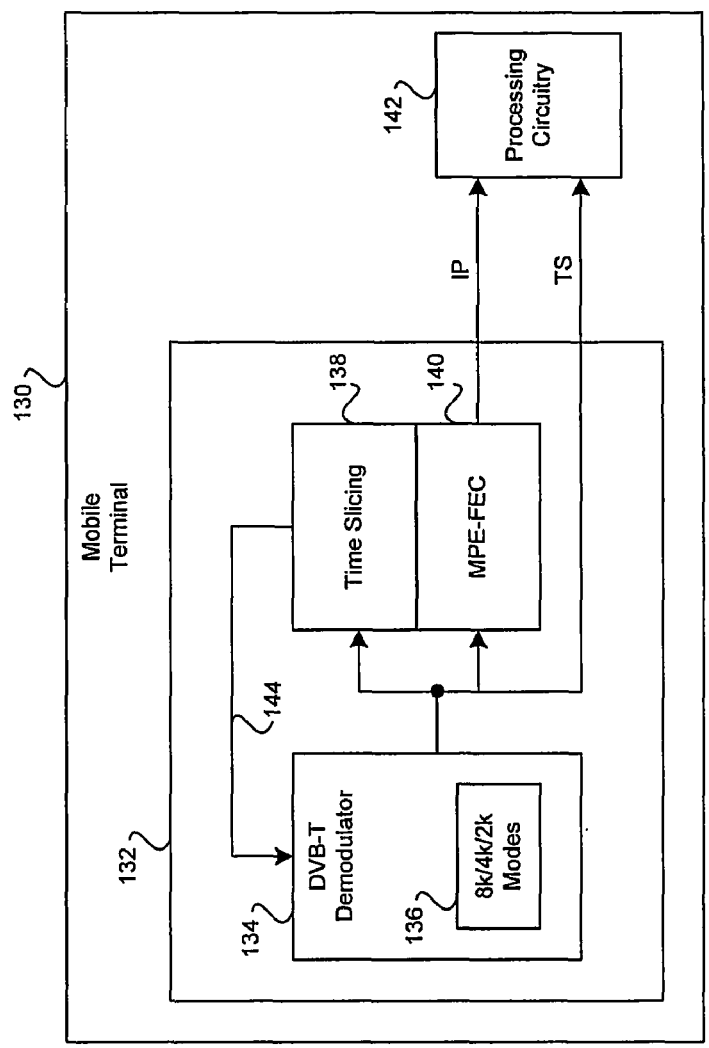
FIG. 1e is a high-level block diagram of exemplary DVB-H receiver circuitry in a mobile terminal, which may be utilized in connection with an embodiment of the invention.

FIG. 1e is a high-level block diagram of exemplary DVB-H receiver circuitry in a mobile terminal, which may be utilized in connection with an embodiment of the invention. Referring to FIG. 1e, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2 k, 4 k and/or 8 k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1F:
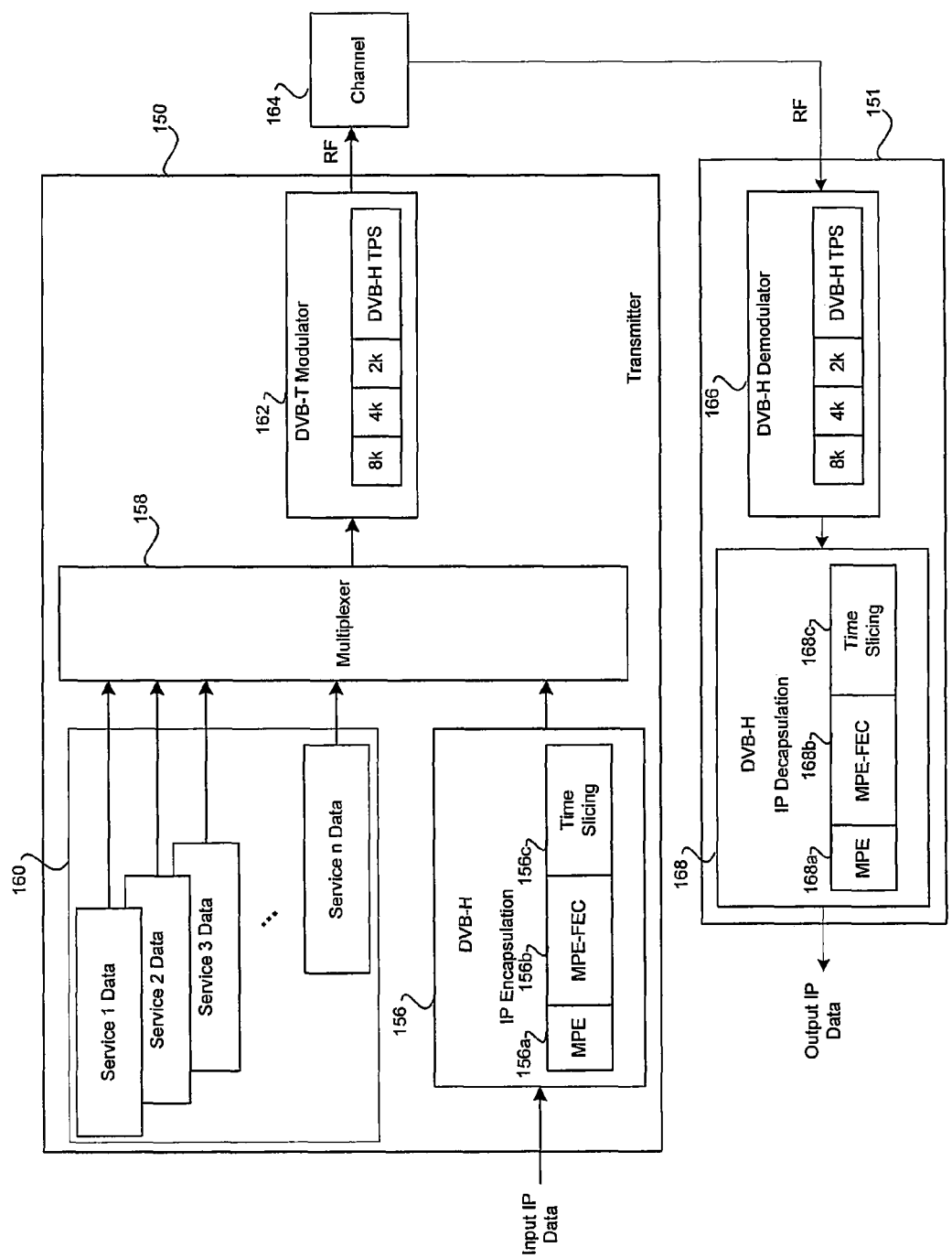
FIG. 1f is a block diagram illustrating the sharing of a multiplexer (MUX) by a plurality of MPEG2 services, which may be utilized in connection with an embodiment of the invention.

FIG. 1*f* is a block diagram illustrating the sharing of a multiplexer (MUX) by a plurality of MPEG2 services, which may be utilized in connection with an embodiment of the invention. Referring to FIG. 1*f*, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168.

The DVB-H encapsulator block 156 may comprise MPE block 156*a*, MPE-FEC block 156*b* and time slicing block 156*c*.

The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data.

The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1*e*. The DVB-H decapsulation block 168 may comprise MPE block 168*a*, MPE-FEC block 168*b* and time slicing block 168*c*. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
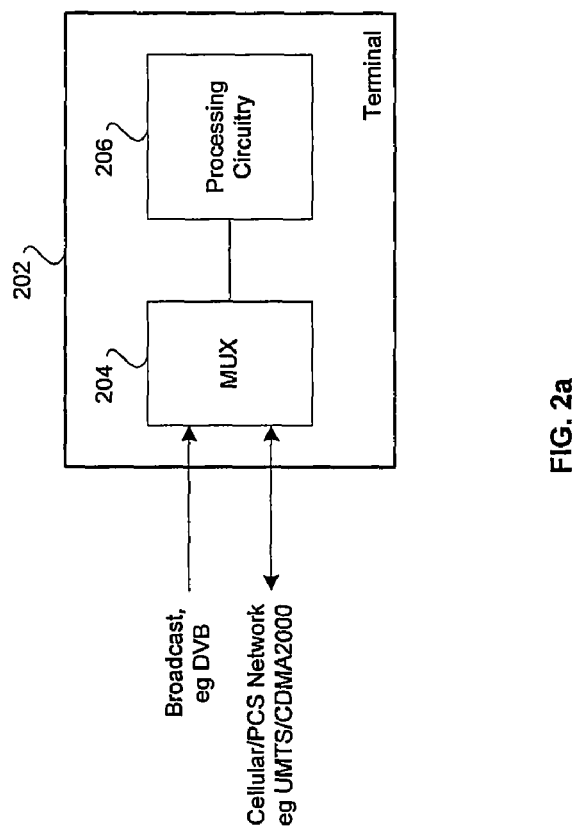
FIG. 2a is a block diagram of a mobile terminal that is adapted to receive VHF/UHF broadcasts and cellular communications, in accordance with an embodiment of the invention.

FIG. 2*a* is a block diagram of a mobile terminal that is adapted to receive VHF/UHF broadcasts and cellular communications, in accordance with an embodiment of the invention. Referring to FIG. 2*a*, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 2B:
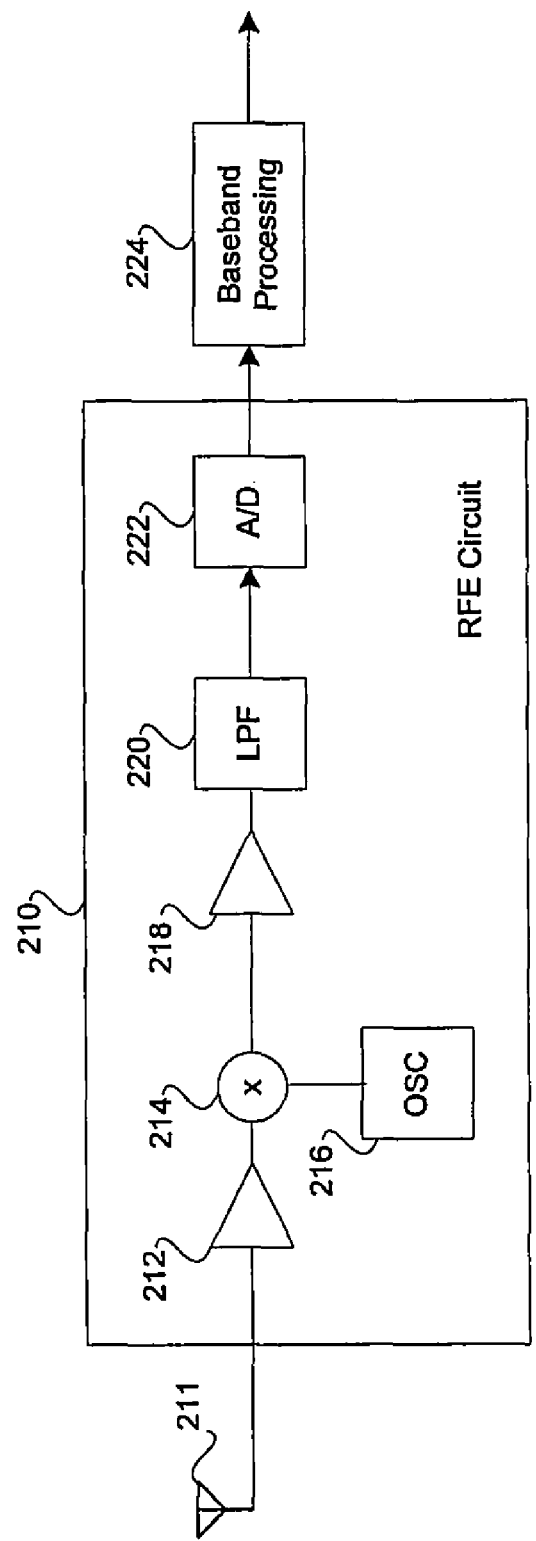
FIG. 2b is a block diagram illustrating receive processing circuit of an RF integrated circuit (RFIC), in accordance with an embodiment of the invention.

FIG. 2*b* is a block diagram illustrating receive processing circuit of an RF integrated circuit (RFIC), in accordance with an embodiment of the invention. Referring to FIG. 2*b*, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and/or a plurality of signals in the VHF/UHF band. U.S. application Ser. No. 11/010,883, U.S. application Ser. No. 11/011,006, U.S. application Ser. No. 11/0010,487, all of which are filed on even date herewith and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide a oscillating signal that may be adapted to mix the output signal generated from the output of the low noise amplifier 212 down to a baseband. The low noise amplifier (LNA) or amplifier 218 may comprise suitable circuitry and/or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic, circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received form an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 2C:
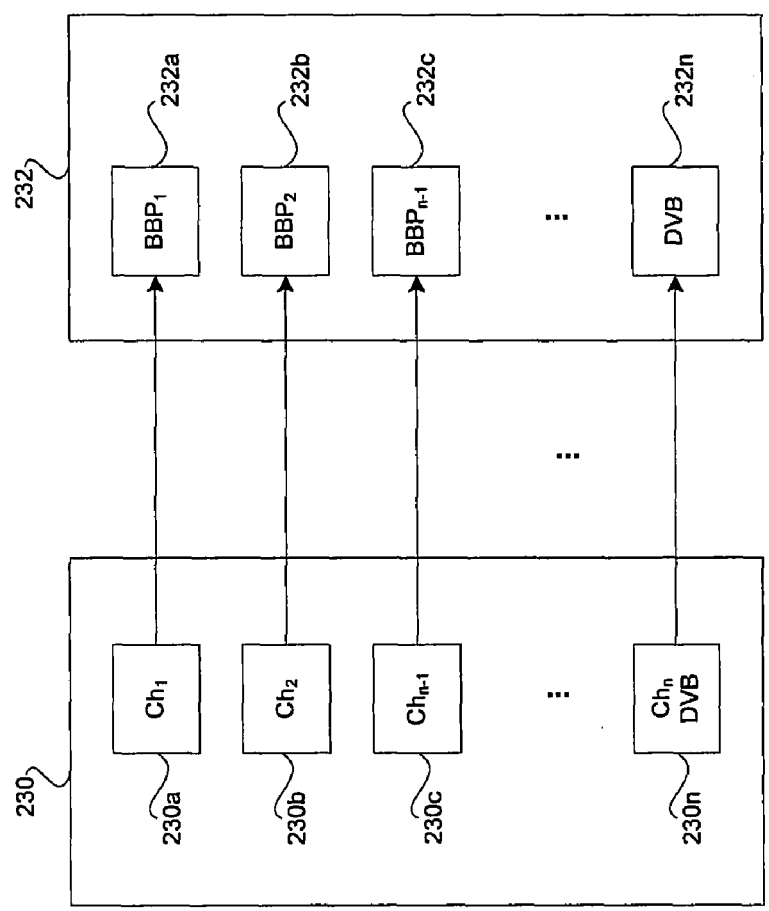
FIG. 2c is a high-level block diagram illustrating an exemplary configuration for a RFIC and a base band processing circuit, in accordance with an embodiment of the invention.

FIG. 2c is a high-level block diagram illustrating an exemplary configuration for a RFIC and a base band processing circuit, in accordance with an embodiment of the invention. Referring to FIG. 2c, there is shown RFIC 230 and baseband circuitry 232. The RFIC 230 comprises a plurality of RF processing circuits 230a, 230b, 230c and 230n. The RF processing circuits 230a, 230b, 230c and 230n may be integrated in a single integrated circuit (IC) or chip. The baseband processing circuitry 232 comprises a plurality of baseband processing circuits 232a, 232b, 232c and 232n. The baseband processing circuits 232a, 232b, 232c and 232n may be integrated into a single integrated circuit (IC) or chip.

In operation, each of the RF processing circuits in the RFIC 230 may be adapted to process a single channel. For example, each of the RF processing circuits 230a, 230b and 230c may be adapted to process separate cellular channel, namely, channel 1, channel 2 and channel (n−1), respectively. The RF processing circuit 230n many be adapted to process a VHF/UHF broadcast channel n.

Each of the baseband processing circuits in the baseband processing circuitry 230 may be adapted to process a single channel. For example, each of the baseband processing circuits 232a, 232b and 232c may be adapted to process separate cellular channels, namely, channel 1, channel 2 and channel (n−1), respectively. The RF processing circuit 232n may be adapted to process a VHF/UHF broadcast channel n. Use of a single RFIC and a single baseband processing integrated circuit saves on the size of the processing circuitry, which may significantly reduce cost.

Figure 2D:
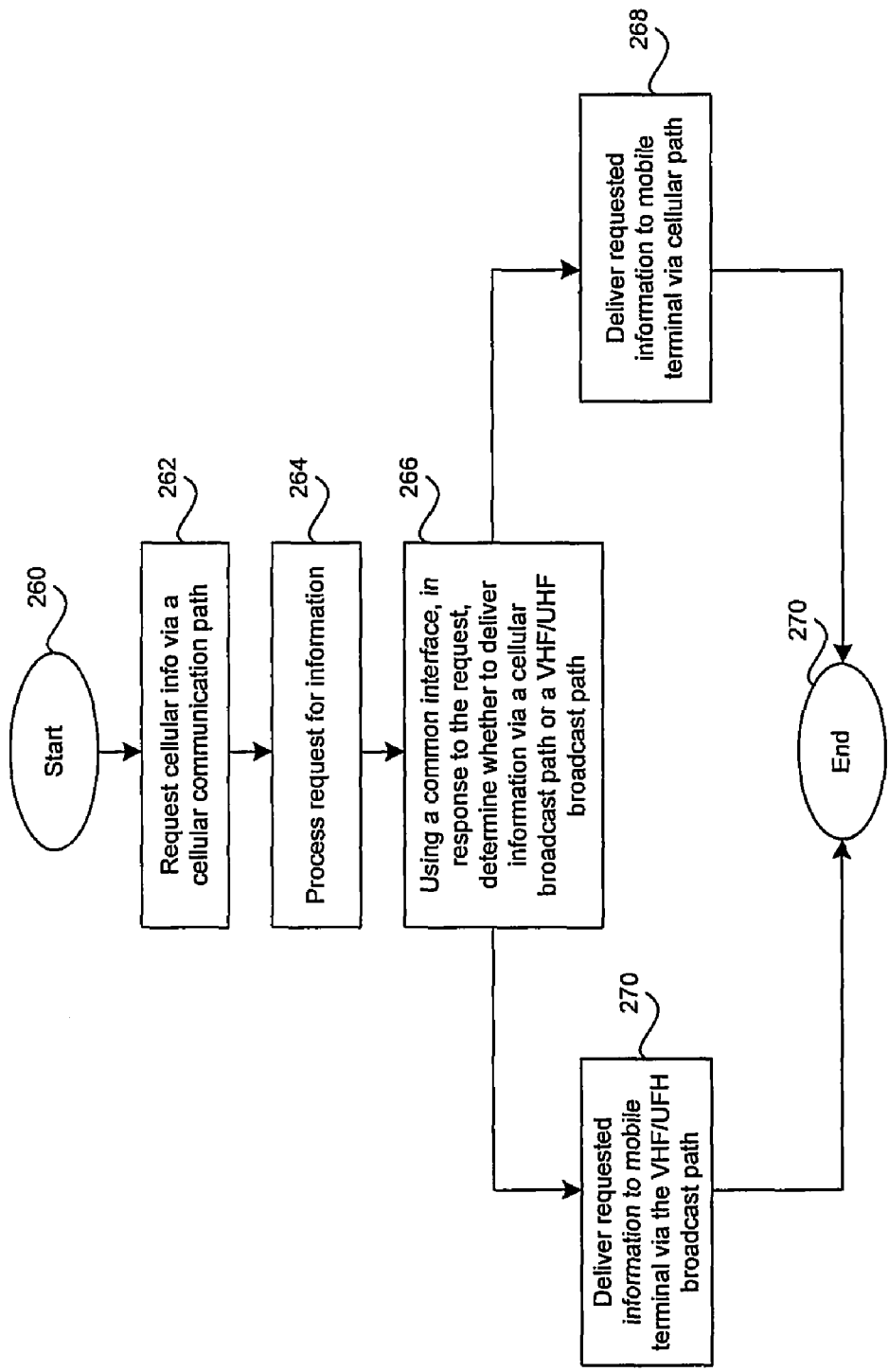
FIG. 2d is a flowchart illustrating exemplary steps that may be utilized in connection with an embodiment of the invention.

FIG. 2d is a flowchart illustrating exemplary steps that may be utilized in connection with an embodiment of the invention. Referring to FIG. 2d, in step 262, the a mobile terminal may request cellular information via a cellular communication path. In step 264, the request for information may be processed. In step 266, in response to the request, it may be determined whether to deliver information via a cellular broadcast path or a VHF/UHF broadcast path. In step 268, based on the determination in step 266, the requested information may be delivered to the mobile terminal via the cellular broadcast path. In step 270, based on the determination in step 266, the requested information may be delivered to the mobile terminal via the VHF/UHF broadcast path.

Figure 2E:
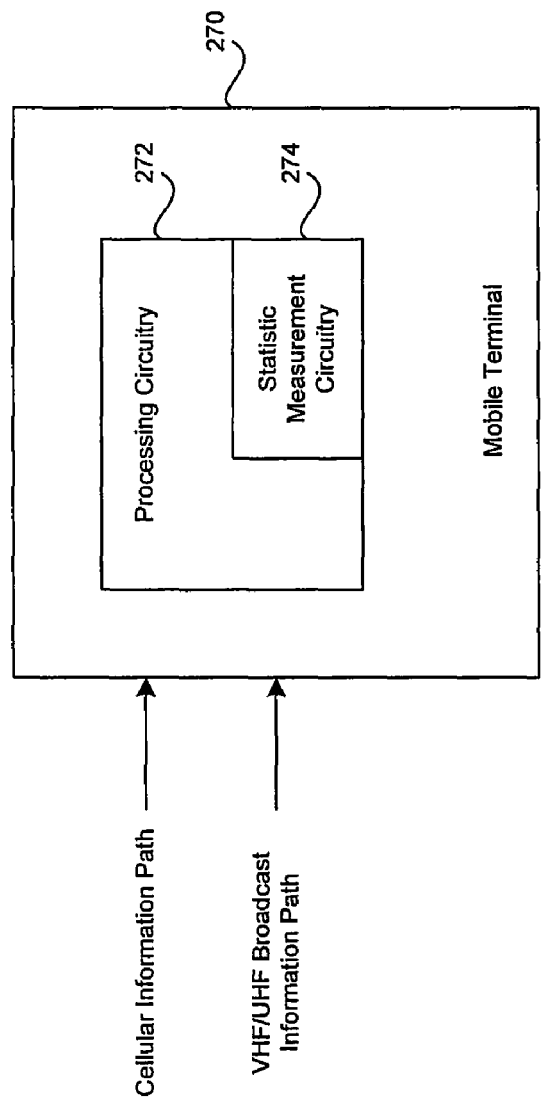
FIG. 2e is a diagram of an exemplary mobile terminal that may be utilized for communicating information via a plurality of different networks, in accordance with an embodiment of the invention.

FIG. 2e is a diagram of an exemplary mobile terminal that may be utilized for communicating information via a plurality of different networks, accordance with an embodiment of the invention. Referring to FIG. 2e, there is shown a mobile terminal 270 comprising processing circuitry 272. The processing circuitry 272 may comprise statistic measurement circuitry 274.

In operation, the mobile terminal 270 may be adapted to receive cellular information via a cellular information path and VHF/UHF broadcast information via a VHF/UHF broadcast information path. The mobile terminal 270 may switch between processing the broadcast information received information received via the VHF/UHF broadcast communication path and the cellular information received via the cellular communication path. The switching may be based on a measured broadcast signal statistic associated with a signal bearing the broadcast information and a measured cellular signal statistic associated with a signal bearing the cellular information. The measured broadcast signal statistic and/or the measured cellular signal statistic may comprise exemplary information such as received signal strength indication (RSSI), SNR, signal quality or other channel related information. The quality of service will be enhanced by measuring SNR and RSSI to determine if the MBMS channel or the DVB channel are the best to broadcast data over. Also, another measure that may be used is determining the system capacity of the cellular network and the DVB network to determine the best broadcasting network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for controlling signal processing in a multi-network device, the system comprising:
   one or more circuits that enables receiving of a digital video broadcast signal;
   said one or more circuits enables processing a channel of said digital video broadcast signal according to a first selection, wherein at least one channel of said digital video broadcast signal comprises broadcast multimedia content;
   said one or more circuits enables receiving a cellular communication signal; and
   said one or more circuits enables processing said cellular communication signal according to a second selection.

2. The system according to claim 1, wherein said broadcast multimedia content comprises Internet content.

3. The system according to claim 1, wherein said one or more circuits enables storing at least a portion of said received digital video broadcast signal and at least a portion of said received cellular communication signal in a commonly accessible memory.

4. The system according to claim 1, wherein said one or more circuits enables coordinating communication of information associated with said received digital video broadcast signal and said received cellular communication signal via a communication interface integrated in the multi-network device that handles said processing of said digital video broadcast signal and said cellular communication signal.

5. The system according to claim 1, wherein said one or more circuits enables generating a request via a cellular communication path to receive said digital video broadcast signal via a broadcast communication path, said request generated utilizing said communication interface integrated in the multi-network device.

6. The system according to claim 1, wherein said first selection is a user request.

7. The system according to claim 1, wherein said second selection is a user request.

8. A system for controlling signal processing in a multi-network device, the system comprising:
   one or more circuits that enables receiving of a digital video broadcast signal;
   said one or more circuits enables processing a channel of said digital video broadcast signal according to a first selection, wherein at least one channel of said digital video broadcast signal comprises broadcast multimedia content;
   said one or more circuits enables receiving a WLAN signal; and
   said one or more circuits enables processing said WLAN signal according to a second selection.

9. The system according to claim 8, wherein said broadcast multimedia content comprises Internet content.

10. The system according to claim 8, wherein said WLAN signal comprises Internet content.

11. The system according to claim 8, wherein said one or more circuits enables storing at least a portion of said received digital video broadcast signal in a commonly accessible memory.

12. The system according to claim 8, wherein said one or more circuits enables coordinating communication of information associated with said received digital video broadcast signal and information associated with a received cellular communication signal via a communication interface integrated in the multi-network device.

13. The system according to claim 8, wherein said first selection is a user request.

14. The system according to claim 8, wherein said second selection is a user request.

15. A system for controlling signal processing in a multi-network device, the system comprising:
   one or more circuits that enables receiving of a digital video broadcast signal;
   said one or more circuits enables processing a channel of said digital video broadcast signal according to a first selection, wherein at least one channel of said digital video broadcast signal comprises broadcast multimedia content;
   said one or more circuits enables receiving of multimedia content from a WLAN service provider; and
   said one or more circuits enables processing said received multimedia content from said WLAN service provider according to a second selection.

16. The system according to claim 15, wherein said broadcast multimedia content comprises Internet content.

17. The system according to claim 15, wherein said multimedia content received from said WLAN service provider comprises Internet content.

18. The system according to claim 15, wherein said one or more circuits enables storing at least a portion of said received digital video broadcast signal in a commonly accessible memory.

19. The system according to claim 15, wherein said one or more circuits enables coordinating communication of information associated with said received digital video broadcast signal and information associated with a received cellular communication signal via a communication interface integrated in the multi-network device.

20. The system according to claim 15, wherein said one or more circuits enables generating a request via a cellular communication path to receive said digital video broadcast signal via a broadcast communication path, said request generated utilizing said communication interface integrated in the multi-network device.

21. The system according to claim 15, wherein said first selection is a user request.

22. The system according to claim 15, wherein said second selection is a user request.

23. A system for controlling signal processing in a multi-network device, the system comprising:
   one or more circuits that enables receiving of a digital video broadcast signal;
   said one or more circuits enables receiving a WLAN signal;
   said one or more circuits enables receiving a cellular signal; and said one or more circuits enables processing of one or more of said digital video broadcast signal, said WLAN signal, and/or said cellular signal according to a user selection.

24. The system according to claim 23, wherein at least one channel of said digital video broadcast signal comprises broadcast multimedia content.

25. The system according to claim 24, wherein said broadcast multimedia content comprises Internet content.

26. The system according to claim 23, wherein said WLAN signal comprises Internet content.

27. The system according to claim 23, wherein said one or more circuits enables storing at least a portion of said received digital video broadcast signal and at least a portion of said received cellular communication signal in a commonly accessible memory.

28. The system according to claim 23, wherein said one or more circuits enables coordinating communication of information associated with said received digital video broadcast signal and said received cellular communication signal via a communication interface integrated in the multi-network device that handles said processing of said digital video broadcast signal and said cellular communication signal.

29. The system according to claim 23, wherein said one or more circuits enables generating a request via a cellular communication path to receive said digital video broadcast signal via a broadcast communication path, said request generated utilizing said communication interface integrated in the multi-network device.

30. A system for controlling signal processing in a multi-network device, the system comprising:
one or more circuits that enables receiving of a digital video broadcast signal;
said one or more circuits enables processing a channel of said digital video broadcast signal according to a first selection, wherein at least one channel of said digital video broadcast signal comprises broadcast multimedia content;
said one or more circuits enables receiving a WiMax signal; and
said one or more circuitry enables processing said WiMax signal according to a second selection.

31. The system according to claim 30, wherein said broadcast multimedia content comprises Internet content.

32. The system according to claim 30, wherein said multimedia content received from said WiMax service provider comprises Internet content.

33. The system according to claim 30, wherein said one or more circuits enables storing at least a portion of said received digital video broadcast signal in a commonly accessible memory.

34. The system according to claim 30, wherein said one or more circuits enables coordinating communication of information associated with said received digital video broadcast signal and information associated with a received cellular communication signal via a communication interface integrated in the multi-network device.

35. The system according to claim 30, wherein said one or more circuits enables generating a request via a cellular communication path to receive said digital video broadcast signal via a broadcast communication path, said request generated utilizing said communication interface integrated in the multi-network device.

36. The system according to claim 30, wherein said first selection is a user request.

37. The system according to claim 30, wherein said second selection is a user request.

38. A system for controlling signal processing in a multi-network device, the system comprising:
one or more circuits that enables receiving of a digital video broadcast signal;
said one or more circuits enables processing a channel of said digital video broadcast signal according to a first selection, wherein at least one channel of said digital video broadcast signal comprises broadcast multimedia content;
said one or more circuits enables receiving of multimedia content from a WiMax service provider; and
said one or more circuits enables processing said received multimedia content from said WiMax service provider according to a second selection.

39. The system according to claim 38, wherein said broadcast multimedia content comprises Internet content.

40. The system according to claim 38, wherein said multimedia content received from said WiMax service provider comprises Internet content.

41. The system according to claim 38, wherein said one or more circuits enables storing at least a portion of said received digital video broadcast signal in a commonly accessible memory.

42. The system according to claim 38, wherein said one or more circuits enables coordinating communication of information associated with said received digital video broadcast signal and information associated with a received cellular communication signal via a communication interface integrated in the multi-network device.

43. The system according to claim 38, wherein said one or more circuits enables generating a request via a cellular communication path to receive said digital video broadcast signal via a broadcast communication path, said request generated utilizing said communication interface integrated in the multi-network device.

44. The system according to claim 38, wherein said first selection is a user request.

45. The system according to claim 38, wherein said second selection is a user request.

46. A system for controlling signal processing in a multi-network device, the system comprising:
one or more circuits that enables receiving of a digital video broadcast signal;
said one or more circuits enables receiving a WiMax signal;
said one or more circuits enables receiving a cellular signal; and
said one or more circuits enables processing of one or more of said digital video broadcast signal, said WiMax signal, and/or said cellular signal according to a user selection.

47. The system according to claim 46, wherein at least one channel of said digital video broadcast signal comprises broadcast multimedia content.

48. The system according to claim 47, wherein said broadcast multimedia content comprises Internet content.

49. The system according to claim 46, wherein said WiMax signal comprises Internet content.

50. The system according to claim 46, wherein said one or more circuits enables storing at least a portion of said received digital video broadcast signal and at least a portion of said received cellular communication signal in a commonly accessible memory.

51. The system according to claim 46, wherein said one or more circuits enables coordinating communication of information associated with said received digital video broadcast signal and said received cellular communication signal via a communication interface integrated in the multi-network device that handles said processing of said digital video broadcast signal and said cellular communication signal.

52. The system according to claim 46, wherein said one or more circuits enables generating a request via a cellular communication path to receive said digital video broadcast signal via a broadcast communication path, said request generated utilizing said communication interface integrated in the multi-network device.

* * * * *